United States Patent
Torres et al.

(10) Patent No.: US 10,467,711 B2
(45) Date of Patent: Nov. 5, 2019

(54) REFLECTANCE PANELS FEATURING MACHINE-READABLE SYMBOL AND METHODS OF USE

(71) Applicant: MICASENSE, INC., Seattle, WA (US)

(72) Inventors: Gabriel Torres, Seattle, WA (US); Justin McAllister, Seattle, WA (US); Jefferson McBride, Seattle, WA (US)

(73) Assignee: MICASENSE, INC., Seattle, WA (US)

( * ) Notice: Subject to any disclaimer, the term of this patent is extended or adjusted under 35 U.S.C. 154(b) by 375 days.

(21) Appl. No.: 15/154,719

(22) Filed: May 13, 2016

(65) Prior Publication Data

US 2017/0352110 A1   Dec. 7, 2017

Related U.S. Application Data

(60) Provisional application No. 62/160,732, filed on May 13, 2015.

(51) Int. Cl.

| | | |
|---|---|---|
| *G06K 9/46* | (2006.01) | |
| *G06K 9/78* | (2006.01) | |
| *G06Q 50/02* | (2012.01) | |
| *G06T 7/00* | (2017.01) | |
| *G06K 9/00* | (2006.01) | |
| *G06K 9/62* | (2006.01) | |

(52) U.S. Cl.
CPC ......... *G06Q 50/02* (2013.01); *G06K 9/00664* (2013.01); *G06K 9/6202* (2013.01); *G06T 7/97* (2017.01); *G06K 9/0063* (2013.01); *G06K 9/46* (2013.01); *G06K 9/78* (2013.01)

(58) Field of Classification Search
CPC ...... G06Q 50/02; G06T 7/97; G06K 9/00664; G06K 9/6202; G06K 9/46; G06K 9/79

See application file for complete search history.

(56) References Cited

U.S. PATENT DOCUMENTS

| | | | | |
|---|---|---|---|---|
| 2012/0211555 A1* | 8/2012 | Rowe | ................... | G06K 7/1404 235/375 |
| 2013/0306728 A1* | 11/2013 | Thuries | .............. | G06K 7/10831 235/455 |
| 2015/0102105 A1* | 4/2015 | Perret | .............. | G06K 19/06046 235/440 |
| 2016/0104018 A1* | 4/2016 | Bianchi | .................. | G06K 7/015 235/462.2 |

\* cited by examiner

*Primary Examiner* — Gregory J Toatley, Jr.
*Assistant Examiner* — Lynda Dinh
(74) *Attorney, Agent, or Firm* — Seed Intellectual Property Law Group LLP

(57) ABSTRACT

According to aspects of the present disclosure, systems, apparatuses, and methods are provide that automate the process of finding captures of reflectance panels, detecting the particular regions of each image that represent the reflectance panel, and retrieving or otherwise obtaining reflectance information for the reflectance panel. One example reflectance panel assembly includes a reflectance panel and a machine-readable symbol.

15 Claims, 6 Drawing Sheets

REFLECTANCE PANELS FEATURING MACHINE-READABLE SYMBOL AND METHODS OF USE

BACKGROUND

Technical Field

The present disclosure generally relates to calibration of images. More particularly, the present disclosure relates to systems and methods that employ reflectance panels for calibration of images.

Description of the Related Art

The use of cameras and imagers for remote sensing from low altitudes has become widespread as a result of the proliferation of small unmanned aircraft, commonly referred to as drones. There are applications that require measurement of absolute reflected light energy from an object of interest. As one example, the measurement of absolute reflected light energy from soil and vegetation may be an important aspect of agricultural remote sensing missions.

One technique of obtaining absolute reflectance measurements is to use a calibrated reflectance panel. For example, the reflectance panel can be a piece of material with a coating that typically reflects light in a Lambertian fashion and that generally has a flat reflectance curve for the wavelengths of interest.

Thus, the reflectance panel typically has known reflectance properties for each wavelength of light in the range of interest. Such known reflectance properties can be used to calibrate or otherwise adjust obtained image values for incident light conditions.

Typically, an image of the reflectance panel is captured with the camera. In the example low altitude imaging scenario, reflectance panel image capture may be done before, after, or during flight, or in any combination of these.

By comparing the values of light energy measured by the camera for objects other than the reflectance panel with values of light energy measured by the camera for the reflectance panel, a calibration factor may be obtained that relates values of pixel intensity of the camera to an absolute percent reflectance.

BRIEF SUMMARY

One challenge of using the reflectance panels described above is that in order to use the reflectance panel calibration technique, images that depict the panel must first be identified. This identification process is usually done in a manual fashion by searching through image sets for panel captures. Furthermore, manual identification of the areas of the image that depict the reflectance panel is then required.

In addition, the calibration of the reflectance panel will vary from panel to panel. Therefore, panel-specific calibration information is required for proper application of incident light conditions. Such panel-specific calibration information is typically manually retrieved and then entered.

Such manual identification of panel captures, manual identification of areas of images that correspond to panels, and manual retrieval and entry of calibration information represent extreme inefficiencies in the image processing pipeline. Therefore, systems and methods that provide efficient identification of panel captures, efficient identification of areas of images that correspond to reflectance panels, and/or efficient retrieval and entry of panel-specific calibration information are highly desirable.

According to aspects of the present disclosure, systems, apparatuses, and methods are provided that automate the process of finding captures of reflectance panels, detecting the particular regions of each image that represent the reflectance panel, and retrieving or otherwise obtaining reflectance information for the reflectance panel.

One aspect of the present disclosure is directed to a reflectance panel assembly that includes a reflectance panel and a machine-readable symbol. The reflectance panel includes a reflectance portion on at least one surface thereof, the reflectance portion having one or more known reflectance properties for at least a portion of the electromagnetic spectrum. The machine-readable symbol includes machine-readable information that describes at least one parameter of the reflectance panel.

Another aspect of the present disclosure is directed to a computer-implemented method to automatically compensate images for incident light conditions. The method includes receiving, by one or more computing devices, a plurality of sets of image information that respectively represent a plurality of images, the plurality of images comprising at least one panel image that depicts a reflectance panel and a machine-readable symbol that includes information related to the reflectance panel. The method includes analyzing, by the one or more computing devices, the plurality of images to identify the at least one panel image. The method includes obtaining, by the one or more computing devices, calibration information associated with the reflectance panel based at least in part on the information included in the machine-readable symbol, the calibration information descriptive of one or more known reflectance properties of the reflectance panel for at least a portion of the electromagnetic spectrum. The method includes identifying, by the one or more computing devices, a group of pixels of the at least one panel image that corresponds to the reflectance panel. The method includes adjusting, by the one or more computing devices, pixel values for each of the plurality of images to compensate for incident light conditions based at least in part on the calibration information and based at least in part on at least one intensity value respectively of the group of pixels of the at least one panel image that corresponds to the reflectance panel.

Another aspect of the present disclosure is directed to a computer-implemented method to detect images that depict a reflectance panel. The method includes receiving, by one or more computing devices, a set of image information that represents an image. The method includes analyzing, by the one or more computing devices, the set of image information to identify information representative of at least one characteristic of the reflectance panel depicted in the image.

Another aspect of the present disclosure is directed to a computer-implemented method to determine a calibration factor for a reflectance panel. The method includes receiving, by one or more computing devices, a set of image information that represents a panel image that depicts at least a portion of the reflectance panel and at least a portion of a machine-readable symbol. The method includes obtaining, by the one or more computing devices, calibration information associated with the reflectance panel based at least in part on information included in the machine-readable symbol, the calibration information descriptive of one or more known reflectance properties of the reflectance panel for at least a portion of the electromagnetic spectrum. The method includes identifying, by the one or more computing devices, group of pixels of the at least one panel image that corresponds to the reflectance panel. The method includes determining, by the one or more computing devices, the calibration factor for the reflectance panel based at least in part on the calibration information and based at least in part on at least one intensity value respectively of the group of pixels of the at least one panel image that corresponds to the reflectance panel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

The present disclosure is directed to a system and method of calibrating a series of images by identifying an image that includes a reflectance panel and a symbol, where the symbol provides information about the reflectance panel. The symbol may be any number of machine readable elements, such as a QR code or bar code. The machine readable elements can represent a serial number associate with calibration data stored in a data base or other identifying information about the reflectance panel.

Figure 1:
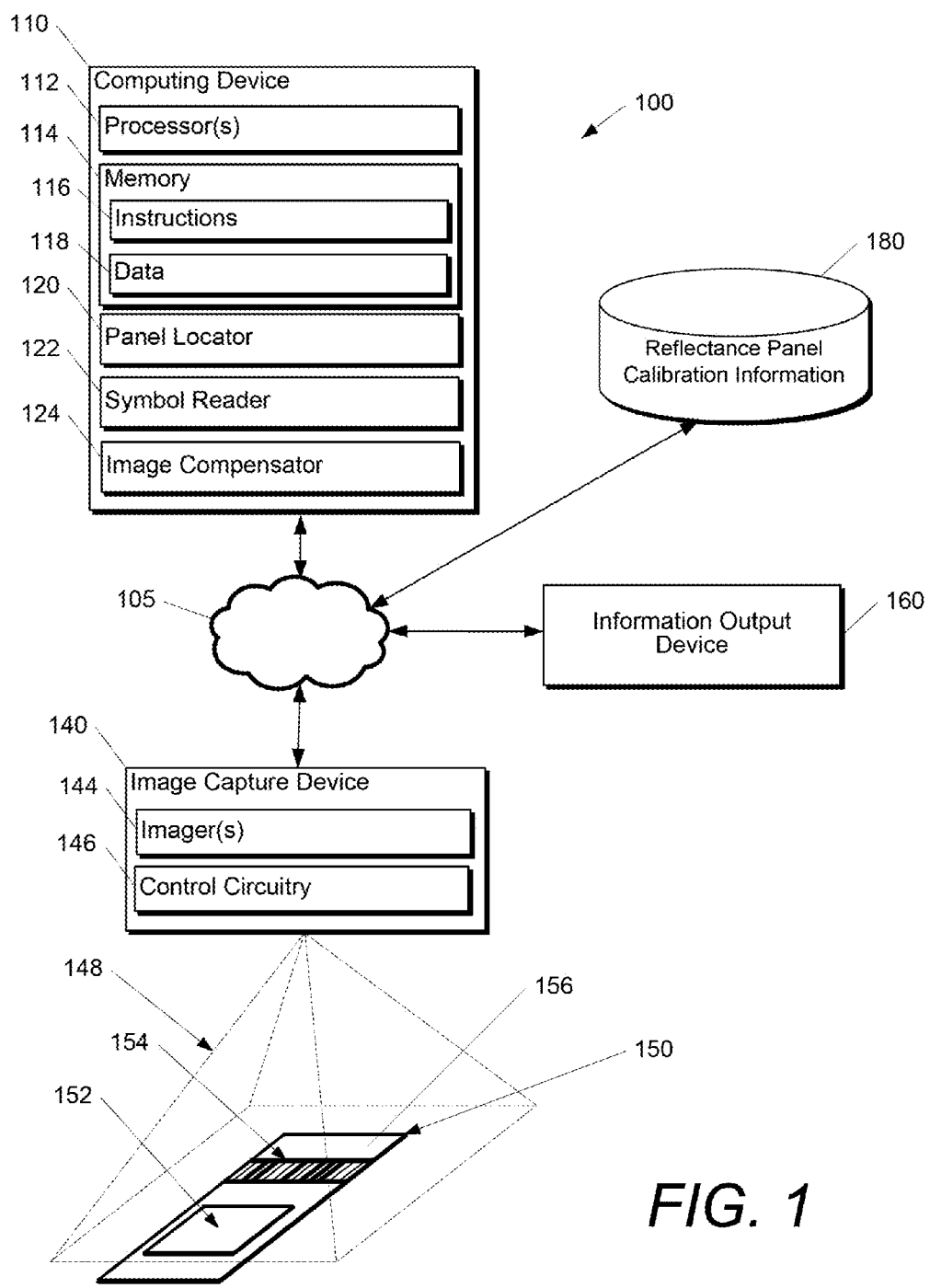
FIG. 1 is a block diagram of an example image processing system, according to at least one illustrated embodiment.

A reflectance panel, such as a panel 152 in FIG. 1, is an object with a known reflectance, often coated with a particular material. Reflectance is the effectiveness of a material to reflect radiant energy. The reflectance of the material is identified as percentage with respect to a range of wavelengths.

If a user wants to evaluate the health of a group of tress in an orchard, the user may use an unmanned or manned aerial vehicle to take a series of images of the trees from above. These images can be analyzed to provide the user with information about the health of these trees. Knowing the incident light of the orchard at the time the images are gathered provides useful calibration information that can be applied to the images. Gathering information about the incident light can be achieved with the reflectance panel and symbol described in this application.

The system is configured to take an image of the reflectance panel at the beginning of a flight path and potentially at other times, such as during the flight path and after the flight is completed. This can be achieved by the user placing the reflectance panel on the ground or a surface in the orchard (the area to be imaged) before, during, and/or after the flight, and allowing the image capture device to image the reflectance panel. These images of the reflectance panel are part of the overall group of images associated with the flight and can be identified by the system in advance of processing the images so that each of the images can be calibrated in accordance with the status of the incident light.

The system is configured to automatically detect the images from the series of images that include the reflectance panel. Once these images are identified, the system reads the symbol, such as a QR code to gather information about the reflectance panel. For example, the QR code could be a serial number provided that corresponds to calibration information saved in a database 180, see FIG. 1. The system can access the database and pull the calibration information from the database. In addition, the system evaluates a group of pixels within the surface area of the reflectance panel. For example, see area 153 in FIG. 5. The system identifies this area and averages each digital number of each pixel in this area to get an average digital number. This average digital number corresponds to a particular known reflectance within a known wavelength range. This average digital number of the area 153 of the reflectance panel 152 is used in conjunction with calibration information pulled from the database to process the images taken during the flight. As will be appreciated, this system can be used in other environments besides aerial vehicles.

FIG. 1 is block diagram of an example image processing system 100, according to at least one illustrated embodiment. The system 100 includes a computing device 110, an image capture device 140, an information output device 160, and a database 180 communicatively coupled over a network 105. The system 100 may operate to process images captured by the image capture device 140.

In particular, the system 100 may operate to compensate images captured by the image capture device 140 for incident light conditions based on calibration information associated with a reflectance panel 152 and captured imagery thereof. The reflectance panel 152 may be included in a reflectance panel assembly 150. The reflectance panel assembly 150 may further include a machine-readable symbol 154.

The reflectance panel 152 may include a reflectance portion on at least one surface. The reflectance portion has one or more known reflectance properties for at least a portion of the electromagnetic spectrum.

The machine-readable symbol 154 may include machine-readable information that describes at least one parameter of the reflectance panel. As examples, the machine-readable information may relate to an identity of the reflectance panel 152 (e.g., provide a unique identifier for the reflectance panel 152) or may describe the one or more known reflectance properties of the reflectance panel 152 (e.g., a calibration factor of the reflectance panel 152). The computing device, either included with the image capture device or in a post-processing location, will read the machine-readable information and use that to calibration the images.

In some implementations, the machine-readable symbol 154 and the reflectance portion of the reflectance panel 152 are coplanar. In some implementations, the machine-readable symbol 154 and the reflectance portion of the reflectance panel 152 are adjacent to each other.

The reflectance panel assembly may further include a platform 156 on which the machine-readable symbol 154 and the reflectance panel 152 are mounted. In some implementations, the reflectance panel 152 has at least one edge that detectably contrasts with a portion of the platform 156 on which the reflectance panel is mounted. In some implementations, the reflectance panel 152 is rectangular and has four edges that detectably contrast with a portion of the platform 156 on which the reflectance panel is mounted. In some implementations, the reflectance panel 152 includes a non-reflectance portion that abuts at least one edge of the reflectance portion and detectably contrasts with the reflectance portion.

In some implementations, at least the reflectance portion of the reflectance panel 152 is planarly offset from the platform 156. As an example, at least the reflectance portion of the reflectance panel 152 may be elevated relative to the platform 156. As another example, at least the reflectance portion of the reflectance panel 152 may be depressed relative to the platform 156.

The platform 156 may include a case that respectively securingly houses one or both of the reflectance panel 152 and the machine-readable symbol 154. As examples, the platform 156 may include at least one of a wood case, a plastic case, a metal case, a wood plate, a plastic plate, and a metal plate.

Figure 7:
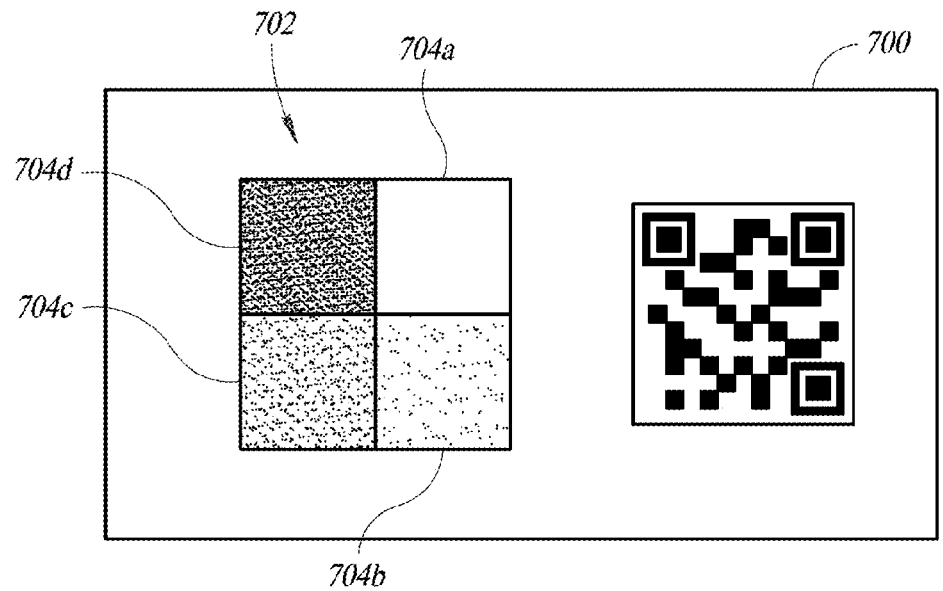
FIGS. 7 and 8 are alternative embodiments of the reflectance panel.

In some implementations, the reflectance panel 152 detectably contrasts with a background on which the reflectance panel is positioned. For example, the background may be black or a dark color that contrasts starkly with a white or gray reflectance portion of the reflectance panel. In some implementations, the reflectance panel assembly 150 may further include a plurality of reflectance panels 152, such as those in FIGS. 7 and 8 that respectively have a plurality of different reflectance properties (e.g., for different wavelengths or spectral bands). FIG. 7 includes a single reflectance portion 702 on a reflectance panel 700. The single reflectance portion includes four reflectance sections 704a, b, c, d. Each of these reflectance sections has a different known reflectance. For example, section 704a, which is shown as white may have a reflectance of 80%, section 704b, which is shown as a light grey may have a reflectance of 60%, section 704c, which is shown as a dark grey may have a reflectance of 40%, and section 704d, which is shown as near black may have a reflectance of 20%.

Figure 8:
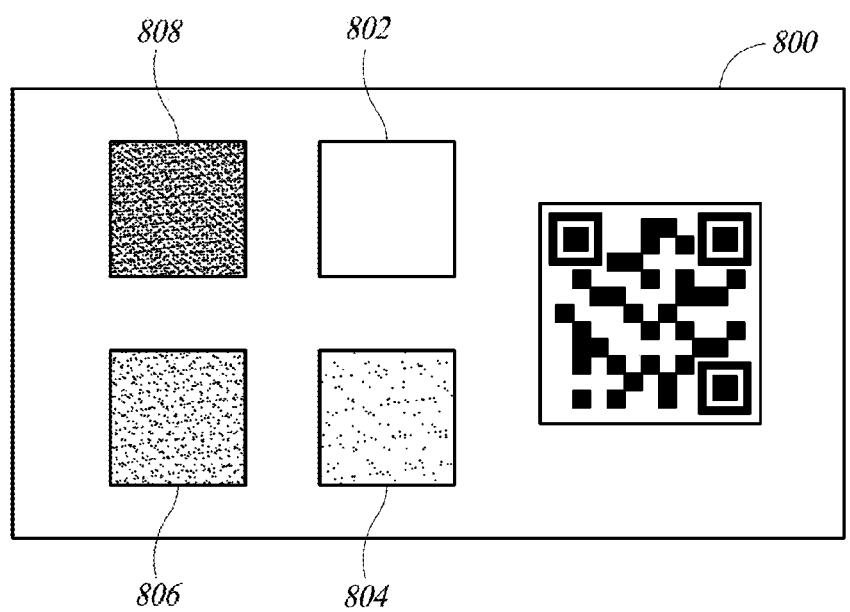

FIG. 8 is an alternative example of the multiple reflectance portions of FIG. 7 where the reflectance panel 800 includes four distinct reflectance portions 802, 804, 806, 808. In FIG. 7, the system would identify corners of the reflectance portion 702 where in FIG. 8, the system would identify boundaries of each of the portions 802, 804, 806, 808. Other patterns of the various reflectance portions are envisioned, such as vertical bars instead of squares. The system can create a formula that defines the reflectance as a function of pixel value based on the average pixels within areas for each reflectance portion.

In some implementations, the machine-readable symbol 154 may be a barcode (e.g., one dimensional barcode), an area or matrix barcode (e.g., QR code), a three-dimensional symbol, human-language letters, or other machine-readable symbols. In some implementations, the machine-readable symbol 154 includes at least one element that enables detection of a relative orientation of the machine-readable symbol 154 in an image. For example, the element may be a finder code. In some implementations, the machine-readable symbol 154 includes at least one element that enables detection of a relative scale or size of the machine-readable symbol in an image.

The machine-readable information included in the machine-readable symbol 154 may be information that identifies a part number of the reflectance panel 152, a serial number of the reflectance panel 152, a date of manufacture of the reflectance panel 152, a manufacturer code of the reflectance panel 152, and/or a database entry identifier associated with the reflectance panel 152. For example, the database entry identified may identify a database entry associated with the reflectance panel 152 and stored in database 180. Thus, the information obtained from the machine-readable symbol 154 may allow the computing device 110 to look up, query, or otherwise access calibration information for the reflectance panel 152 stored in the database 180.

Alternatively or additionally, the machine-readable symbol 154 may include machine-readable information that identifies one or more calibration parameters of the reflectance panel 152. For example, the information may include one or more calibration factors associated with the reflectance panel 152 respectively for one or more spectral bands or wavelengths of light.

The image capture device 140 can be any device capable of capturing an image. For example, the image capture device 140 can be one or more of many different types of cameras or other devices capable of capturing an image or image data.

As an example, the image capture device 140 includes one or more imagers 144 that receive light and output data representative of a plurality of pixels of an image. For example, the imager 144 can output data representative of a color for each of the plurality of pixels, as discussed further below.

In some implementations, the imagers 144 may be respectively associated with different spectral bands. For example, each imager may include a filter that filters or passes a different wavelength or band of wavelengths relative to the filters of other imagers. Thus, the image capture device 140 may be a multispectral camera. However, in some implementations, the image capture device 140 is a single-imager camera. The single-imager camera may output image data in one spectral band, three spectral bands, or other combinations of spectral bands or wavelength representations.

The image capture device 140 also includes control circuitry 146 that controls operation of the image capture device 140. For example, the control circuitry 146 controls image capture timing, image capture rate, image resolution, or other parameters of image capture device 140. In some implementations, the computing device 110 controls or provides instructions to the image capture device 140 via network 105.

The image capture device 140 captures an image of a field of view 148 of the image capture device 140. As shown in FIG. 1, the reflectance panel assembly 150 may be positioned relative to the image capture device 140 such that at least the reflectance panel 152 and the machine-readable symbol 154 are included within the field of view 148 and corresponding captured image.

More particularly, in one example method of use, the reflectance panel assembly 150 may be placed on a surface (e.g., ground, floor, or table) such that incident light from the sky is impacted onto the reflectance panel assembly 150. The image capture device 140 is aimed at the reflectance panel assembly 150 such that the reflectance panel assembly 150 is in the field of view 148 of the image capture device 140. For example, the distance between the reflectance panel assembly 150 and the image capture device 140 may be adjusted such that the reflectance panel assembly 150 fills approximately one-half or more of the field of view 148 of the image capture device 140. One or more images of the reflectance panel assembly 150 are captured by the image capture device 140. If the image capture device 140 has multiple imagers 144, each capture includes multiple images of the reflectance panel assembly 150, one per imager 144. The images of the reflectance panel assembly 150 can be captured before, during, or after flight or intermittently during capture of target imagery. The reflectance panels may be used of aerial vehicle applications or other applications where calibration of the images is beneficial.

Furthermore, use of the systems and methods disclosed herein in the context of remote sensing from low altitudes is provided as one example only. The present disclosure is not limited to such example context. The present disclosure may be applied to compensate imagery captured in any context for any purpose.

The image capture device 140 outputs or otherwise provides to the computing device 110 over network 105 one or more sets of image information that represent one or more captured images (which may or may not depict the reflectance panel assembly 150). For example, each set of image information can include data representative of a plurality of pixels of the image. As an example, the data can include three or more intensity values for each of the plurality of pixels. Each of the intensity values can be representative of an amount of a respective wavelength of light reflected to the imager 144 from an object depicted by the corresponding pixel.

As one example, the intensity values for each pixel include a red intensity value, a green intensity value, and a blue intensity value, thereby describing the color of such pixel within the RGB color space. For example, each of such values may range from 0 to 255. However, other intensity value ranges may be used.

In other implementations, alternatively or in addition to the RGB color space, the intensity values included in the set of image information can describe pixels according to the RGBA color space, CMYK color space, YIQ color space, YPbPr color space, xvYCC color space, HSV color space, HSL color space, or other color spaces or color models, or combinations thereof.

In other implementations, the image information can describe each pixel in multiple wavelength representations or spectral bands, including for example, information associated with a green spectral band, a red spectral band, and an infrared spectral band; or information associated with a blue spectral band, a near infrared spectral band, and a middle infrared spectral band. Pixels can be described with intensity values for other spectral bands, as well.

The computing device 110 can be an embedded computing device, a desktop computer, a laptop computer, a tablet computer, a smartphone, one or more server computing devices, or some combination thereof. The computing device 110 can perform computing operations according to any computer architecture, including parallel, sequential, and/or distributed computing architectures.

Computing device 110 includes a processor 112 and a memory 114. The processor 112 can be one processor or a plurality of processors that are operatively coupled. The processor 112 can be any processing device, such as a microprocessor, microcontroller, integrated circuit, circuitry that implements computer logic, or some combination thereof.

The memory 114 can include any non-transitory information storage device, including, but not limited to, RAM, ROM, hard drives, flash drives, optical media, other memory devices, or some combination thereof. The memory 114 can store information accessible by processor 112, including instructions 116 that can be executed by processor 112. The instructions 116 can be any set of instructions that when executed by the processor 112, cause the processor 112 to provide desired functionality. The memory 114 can also store data 118.

The computing device 110 includes a panel locator 120, a symbol reader 122, and an image compensator 124. The computing device 110 can implement the panel locator 120 to identify images that depict the reflectance panel 152 and isolate one or more portions of such images that depict the reflectance panel 152. The computing device 110 can implement the symbol reader 122 to locate the machine-readable symbol 154 in an image and extract, read, decode, or otherwise obtain the machine-readable information contained therein. For example, the symbol reader 122 may transform image intensity data into binary code (e.g., bits). The computing device 110 can implement the image compensator 124 to compensate images for incident light conditions, for example, by determining a calibration factor for the reflectance panel 152 and using such calibration factor to compensate other images.

In some implementations, each of the panel locator 120, the symbol reader 122, and/or the image compensator 124 includes processor-executable instructions 116 stored in or loaded into memory 114 and executed by processor 112. In other implementations, each of the panel locator 120, the symbol reader 122, and/or the image compensator 124 includes one or more circuits (e.g., integrated circuits), logic components, or other items of computer hardware arranged to implement computer logic or perform other functionality. In other implementations, each of the panel locator 120, the symbol reader 122, and/or the image compensator 124 can be implemented using some combination of processor-executable instructions 116 or data 118 and circuitry.

System 100 can further include the information output device 160. For example, the information output device 160 can be any display device to present or show information, including, for example, a monitor, a screen, a holographic display, a projection display, a three-dimensional display, etc.

As yet another example, the information output device 160 can include a printer to print information, a speaker to audibly output information, and/or a network interface to transmit information regarding the assessed specimen validity characteristic to one or more remote devices or systems via network 105.

The database 180 stores reflectance panel calibration information. For example, the database 180 may store one or more calibration factors associated with the reflectance panel 152 respectively for one or more spectral bands or wavelengths of light.

More particularly, as discussed above, the calibration of a reflectance panel will vary from panel to panel (e.g., from manufacturer to manufacturer, model to model, or intended use to intended use). Therefore, panel-specific calibration information is required for proper application of incident light conditions. The known reflectance characteristics of each particular reflectance panel can be obtained through a radiometric calibration procedure performed, for example, by a manufacture of such particular reflectance panel.

As one example, the information stored in database 180 can include, for each of any number of different reflectance panels, a table containing two columns, one for wavelength or spectral band and one for a corresponding percent reflectance value. The table can have as few as one entry or can have hundreds of entries depending on the resolution of the calibration. The database 180 may organize information for each reflectance panel based on serial number, manufacturer, or other parameters. In some implementations, the database 180 may be denominated as a "cloud database."

Network 105 can be any type of communications network, such as a local area network (e.g., intranet), a wide area network (e.g., Internet), an internal device bus, or some combination thereof and can include any number of wired or wireless links. In general, communication between the components of system 100 via network 105 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 2:
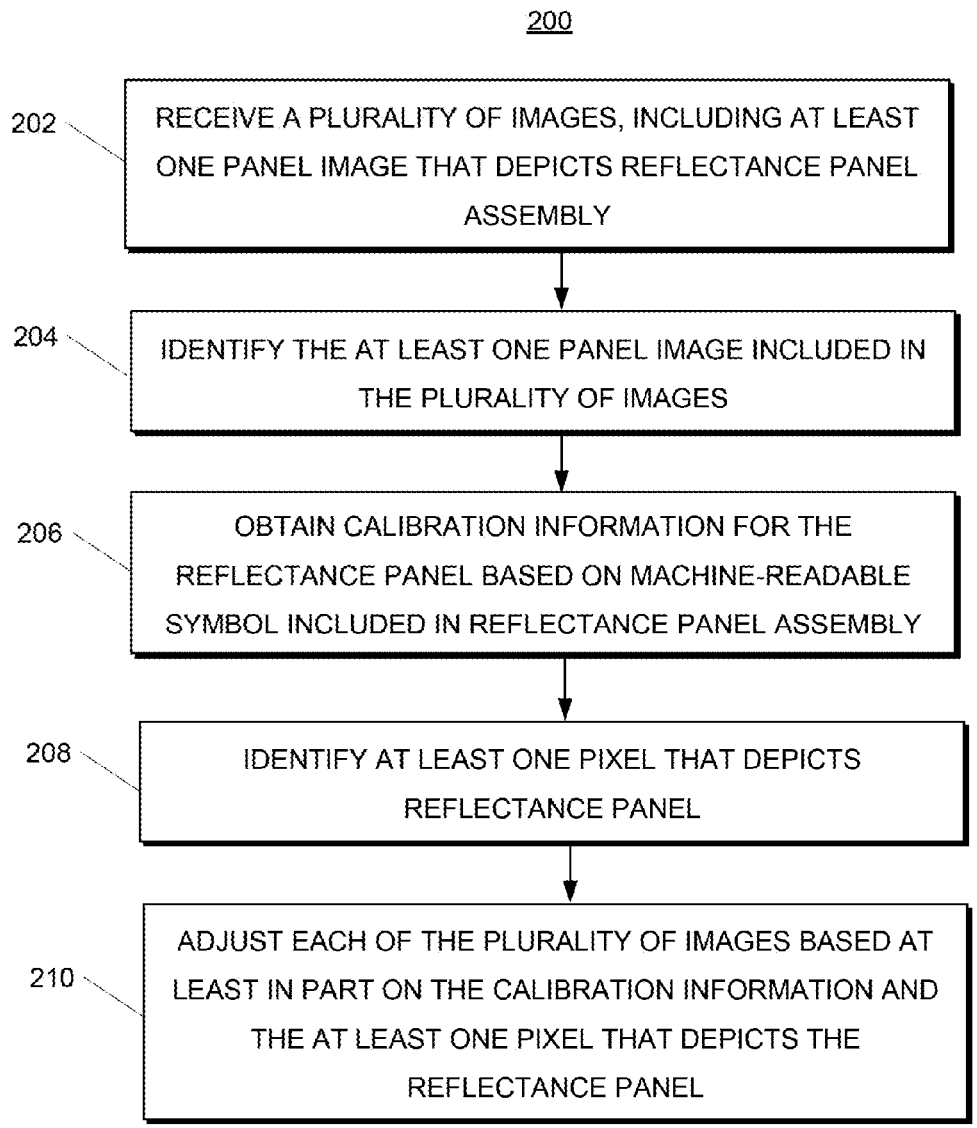
FIG. 2 is a flow chart diagram of an example method to automatically compensate images for incident light conditions, according to at least one illustrated embodiment.

FIG. 2 is a flow chart diagram of an example method 200 to automatically compensate images for incident light conditions, according to at least one illustrated embodiment.

At 202, the system 100 receives a plurality of images from the image capture device 140, including at least one panel image that depicts the reflectance panel assembly. For example, at 202 the system 100 can receive a plurality of sets of image information that respectively represent a plurality of images, the plurality of images comprising at least one panel image that depicts a reflectance panel and a machine-readable symbol that includes information related to the reflectance panel. The image capture device 140 may be coupled to an aerial vehicle that is manned or unmanned. The image capture device 140 may image the reflectance panel near the area that is intended to be imaged, such as at an edge of a field to be imaged. For example, the image capture device may image the panel at a beginning and end of a route to be flown over the field.

At 204, the system 100 identifies the at least one panel image included in the plurality of images. For example, at 204, the system 100 can analyze each of the plurality of images to determine whether such image is a panel image. For example, the system 100 can look for one or more identifiable characteristics of the reflectance panel assembly potentially depicted by each image.

At 206, the system 100 obtains the calibration information associated with the reflectance panel based at least in part on the information included in the machine-readable symbol. For example, the calibration information can be descriptive of one or more known reflectance properties of the reflectance panel for at least a portion of the electromagnetic spectrum. For example, the calibration information can be obtained from a database using the information from the machine-readable symbol.

At 208, the system 100 identifies a group of pixels of the at least one panel image that corresponds to or otherwise depicts the reflectance panel. For example, one or more features of the reflectance panel can be identified within the panel image and the group of pixels can be selected based on the location(s) of such feature(s). For example, see area 153 in FIG. 5.

The system can begin by automatically detecting the machine-readable symbol. The system can determine a location of the reflectance portion based on the identified symbol. The system will have information about a relationship, orientation, and spacing between the symbol and the reflectance portion. Edge detection can be used to determine the area 153 (the group of pixels) that identifies which pixels will be used to determine the average digital number associated with the reflectance panel.

At 210, the system 100 adjusts each of the plurality of images based at least in part on the calibration information obtained at 206 and the group of pixels identified at 208. For example, at 210, the system 100 can adjust pixel values for each of the plurality of images to compensate for incident light conditions based at least in part on the calibration information and based at least in part on at least one intensity value respectively of the group of pixels of the at least one panel image that corresponds to the reflectance panel.

Figure 3:
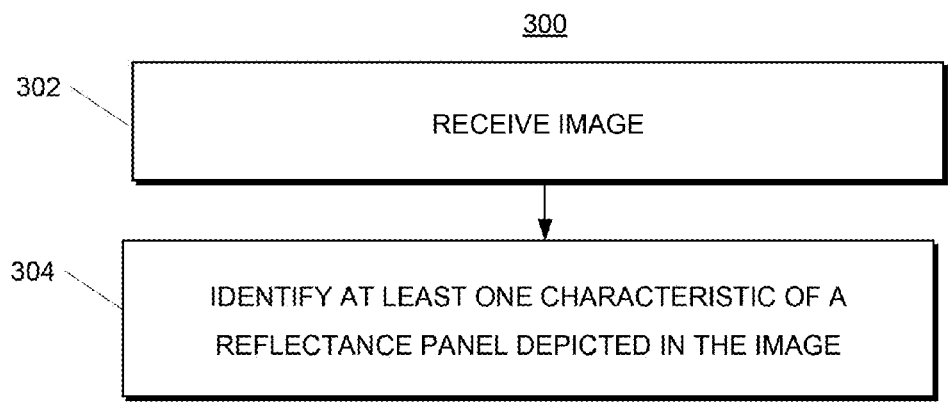
FIG. 3 is a flow chart diagram of an example method to detect images that depict a reflectance panel, according to at least one illustrated embodiment.

FIG. 3 is a flow chart diagram of an example method 300 to detect images that depict a reflectance panel, according to at least one illustrated embodiment.

At 302, the system 100 receives an image from the image capture device. For example, at 302, the system 100 can receive a set of image information that represents an image, such as a plurality of pixels.

At 304, the system 100 analyzes the image received at 302 to identify at least one characteristic of a reflectance panel depicted in the image. For example, at 304, the system 100 can analyze the set of image information to identify information representative of at least one characteristic of the reflectance panel depicted in the image.

If at least one characteristic of the reflectance panel is identified within the image, then the system 100 may designate or otherwise mark the image as a panel image. However, if the system 100 is unable to identify at least one characteristic of the reflectance panel, then the system 100 may designate the image as a non-panel image.

In some implementations, at 304, analyzing the set of image information to identify information representative of at least one characteristic of the reflectance panel may include analyzing the set of image information to identify information representative of at least one edge of the reflectance panel that contrasts against a background depicted in the image, the reflectance panel positioned on the background.

In some implementations, at 304, analyzing the set of image information to identify information representative of at least one characteristic of the reflectance panel may include analyzing the set of image information to identify information representative of a set of edges of a rectangular portion of the reflectance panel that respectively contrast against a background depicted in the image, the reflectance panel positioned on the background.

In some implementations, at 304, analyzing the set of image information to identify information representative of at least one characteristic of the reflectance panel may include analyzing the set of image information to identify information representative of at least one pattern of the reflectance panel depicted in the image. The pattern may be a grouping of different reflectance panel portions, like those shown in FIGS. 7 and 8. The pattern may include grayscale color transitions. These patterns can provide the system with additional data points for use in calibrating the series of images collected in conjunction with the reflectance panel.

In some implementations, at 304, analyzing the set of image information to identify information representative of at least one characteristic of the reflectance panel may include analyzing the set of image information to identify information representative of at least one pattern of a machine-readable symbol depicted in the image, the machine-readable symbol included in a reflectance panel assembly with the reflectance panel.

In some implementations, at 304, analyzing the set of image information to identify information representative of at least one characteristic of the reflectance panel may include analyzing the set of image information to identify information representative of one or more items of machine-readable information included in a machine-readable symbol depicted in the image, the machine-readable symbol included in a reflectance panel assembly with the reflectance panel.

In some implementations, method 300 may further include: identifying an orientation of the reflectance panel depicted in the image; and rotating the image until the orientation of the reflectance panel reaches a predetermined orientation. Identifying an orientation of the reflectance panel depicted in the image may include identifying an orientation of an element of a machine-readable symbol depicted in the image, the machine-readable symbol included in a reflectance panel assembly with the reflectance panel. For example, the element may be a finder code.

In some implementations, method 300 may further include: identifying a scale of the reflectance panel depicted in the image; and scaling the image until the scale of the reflectance panel reaches a predetermined scale. Identifying a scale of the reflectance panel depicted in the image may include identifying a scale of an element of a machine-readable symbol depicted in the image, the machine-readable symbol included in a reflectance panel assembly with the reflectance panel. For example, the element may be a finder code.

In some implementations, method 300 may further include: cropping the image to isolate a defined portion of the image that surrounds the reflectance panel. Cropping the image to isolate a defined portion of the image that surrounds the reflectance panel may include cropping the image to center the reflectance panel in the image.

Figure 4:
FIG. 4 is an example panel image, according to at least one illustrated embodiment.

FIG. 4 is an example panel image 400, according to at least one illustrated embodiment. The panel image 400 depicts the reflectance panel assembly 150, including the reflectance panel 152 and the machine-readable symbol 154. The symbol is a QR code that is on a block positioned within a recess. The reflectance portion is also a block positioned within a recess. The reflectance panel is not perfectly aligned within the image, i.e. the sides of the rectangle of the reflectance panel are not aligned with the sides of the image.

Figure 5:
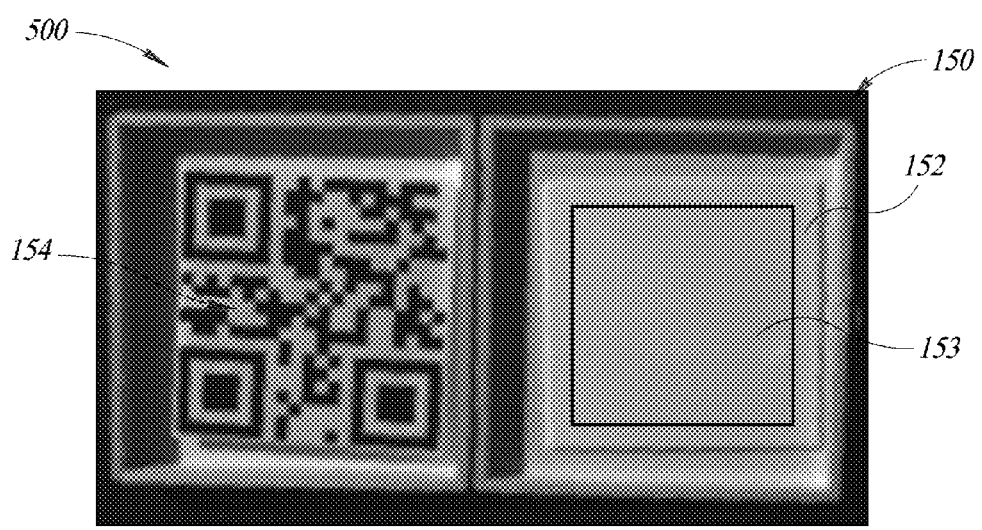
FIG. 5 is an example pre-processed panel image, according to at least one illustrated embodiment.

FIG. 5 is an example processed panel image 500, according to at least one illustrated embodiment. In particular, the panel image 400 of FIG. 4 has been rotated, scaled, and cropped to generate the processed panel image 500. The QR code is now of the left side of the image and the rectangle of the reflectance panel is aligned with the sides of the image.

Figure 6:
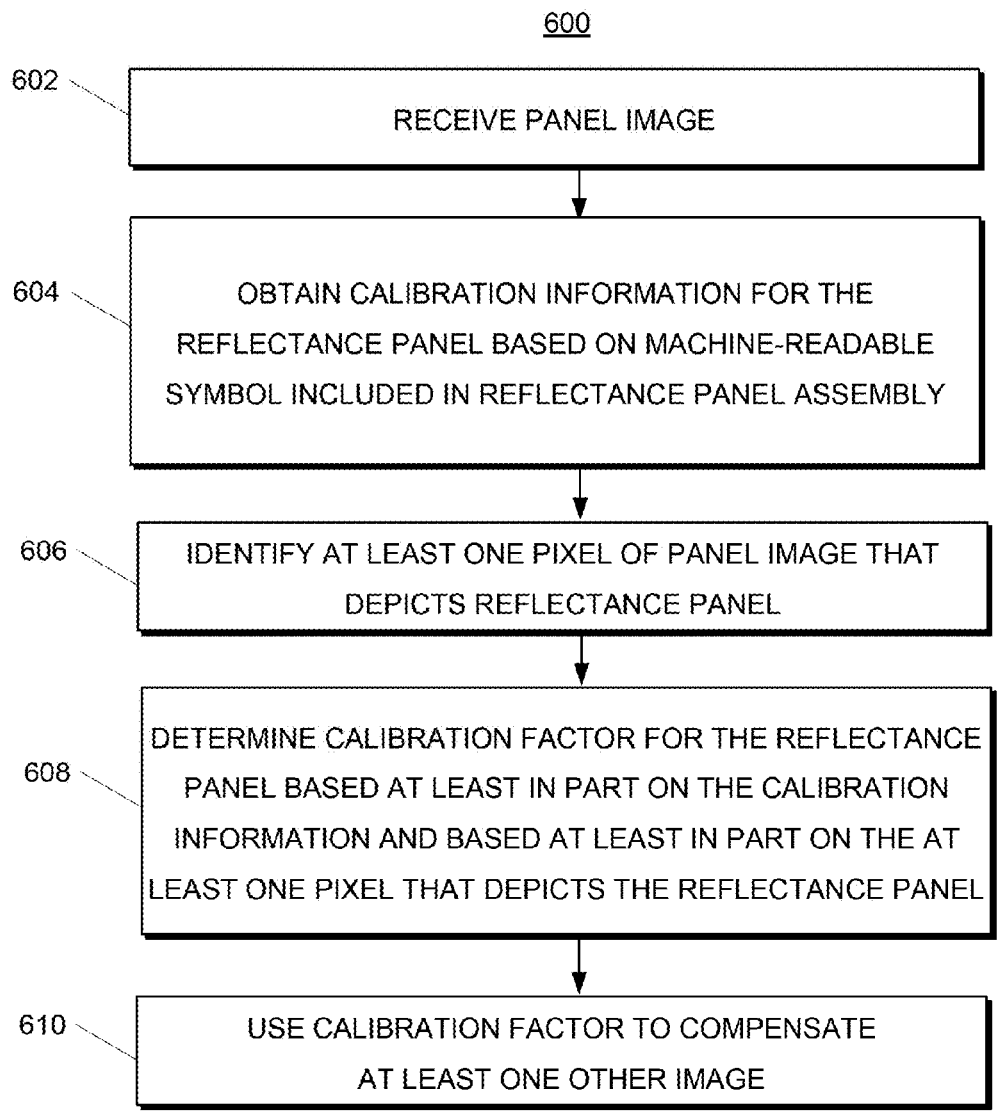
FIG. 6 is an example flow chart diagram of an example method to determine a calibration factor for a reflectance panel.

FIG. 6 is an example flow chart diagram of an example method 600 to determine a calibration factor for a reflectance panel.

At 602, the system 100 receives a panel image. For example, at 602, the system 100 can receive a set of image information that represents a panel image that depicts at least a portion of the reflectance panel and at least a portion of a machine-readable symbol.

In some implementations, at 602, receiving a set of image information that represents a panel image may include receiving the set of image information that represents a cropped, rotated, and scaled panel image that depicts the reflectance panel and the machine-readable symbol at respective known relative image positions.

At 604, the system 100 obtains calibration information for the reflectance panel. For example, at 604 the system 100 can obtain calibration information associated with the reflectance panel based at least in part on information included in the machine-readable symbol. The calibration information may be descriptive of one or more known reflectance properties of the reflectance panel for at least a portion of the electromagnetic spectrum.

In some implementations, at 604, the machine-readable symbol includes the calibration information and obtaining the calibration information may include reading the information included in the machine-readable symbol to obtain the calibration information associated with the reflectance panel.

In some implementations, at 604, the machine-readable symbol includes the calibration information and obtaining the calibration information associated may include decoding the information included in the machine-readable symbol to obtain the calibration information associated with the reflectance panel.

In some implementations, at 604, obtaining calibration information associated with the reflectance panel based at least in part on information included in the machine-readable symbol may include detecting a relative position of the machine-readable code in the panel image.

In some implementations, at 604, the machine-readable symbol includes identification information associated with the reflectance panel and obtaining the calibration information may include reading or decoding the identification information included in the machine-readable symbol and using the identification information to obtain the calibration information.

In some implementations, at 604, using the identification information to obtain the calibration information may include using the identification information to retrieve the calibration information from a database.

At 606, the system 100 identifies group of pixels of the at least one panel image that corresponds to or otherwise depicts the reflectance panel.

In some implementations, at 606, identifying group of pixels of the at least one panel image that corresponds to the reflectance panel may include detecting at least one location respectively of at least one edge or at least one corner of the reflectance panel depicted in the panel image, and selecting the group of pixels based at least in part on the at least one location.

In some implementations, at 606, detecting at least one location respectively of at least one edge or at least one corner of the reflectance panel depicted in the panel image may include detecting at least three locations respectively of at least three edges or at least three corners of the reflectance panel depicted in the panel image. Selecting the group of pixels based at least in part on the at least one location may include selecting the group of pixels based at least in part on the at least three locations. For example, the group of pixels may be contained within a triangle defined by the at least three locations.

In some implementations, at 606, detecting at least one location respectively of at least one edge or at least one corner of the reflectance panel depicted in the panel image may include detecting four corners of the reflectance panel depicted in the panel image. Selecting the group of pixels based at least in part on the at least one location may include selecting a rectangular portion of the panel image that is contained within the four corners of the reflectance panel. For example, the rectangular portion may be a square portion. For example, the rectangular portion may be slightly smaller than the area defined by the four corners. Such may ensure that the selected portion includes only pixels that depict the reflectance panel.

In some implementations, at 606, detecting four corners of the reflectance panel depicted in the panel image may include determining a row value and a column value for each of at least four pixels that respectively correspond to the four corners of the reflectance panel depicted in the panel image.

At 608, the system 100 determines a calibration factor for the reflectance panel. For example, at 608 the system 100 can determine the calibration factor for the reflectance panel based at least in part on the calibration information obtained at 604 and based at least in part on at least one intensity value respectively of the group of pixels of the at least one panel image identified at 606 that corresponds to the reflectance panel.

In some implementations, at 608, determining the calibration factor for the reflectance panel may include: determining at least one raw panel intensity value for the group of pixels of the at least one panel image that corresponds to the reflectance panel; adjusting the at least one raw panel intensity value for one or more of exposure, gain, linearity, offset, or lens effects to generate at least one true panel intensity value; and determining the calibration factor for the reflectance panel based at least in part on the at least one true panel intensity value and the calibration information, wherein the calibration information includes at least one percent reflectance value for the reflectance panel for at least a portion of the electromagnetic spectrum.

The raw panel intensity value may be "read' from the image and may not, for example, have been previously adjusted for exposure, gain, or other radiometric image properties. As an example, in some implementations, at 608, the at least one raw panel intensity value for the group of pixels may be at least one digital number value for the group of pixels.

In some implementations, at 608, determining the calibration factor may include determining a ratio of the at least one percent reflectance value to the at least one true panel intensity value.

In some implementations, the method 600 further includes using at 610 the calibration factor to compensate at least one additional image for incident light conditions. Using the calibration factor to compensate at least one additional image for incident light conditions may include: determining a raw intensity value for each of a plurality of pixels of the at least one additional image; adjusting the raw intensity value of each of the plurality of pixels of the at least one additional image for one or more of exposure, gain, linearity, offset, or lens effects to generate a true intensity value for each of the plurality of pixels; and multiplying the true intensity value for each of the plurality of pixels respectively by the calibration factor to obtain a percent reflectance value for each of the plurality of pixels. As an example, the raw intensity value for each pixel may be a digital number value for each pixel.

In some implementations, the panel image can be processed in at least three different spectral bands. For example, a single-imager image capture device may output image data in three spectral bands. In such implementations, at 608, determining at least one raw panel intensity value for the group of pixels of the at least one panel image that corresponds to the reflectance panel may include determining at least three raw panel intensity values for the group of pixels, the at least three raw panel intensity values respectively corresponding to at least three different spectral bands.

In such implementations, adjusting the at least one raw panel intensity value may include respectively adjusting the at least three raw panel intensity values for one or more of exposure, gain, linearity, offset, or lens effects to respectively generate at least three true panel intensity values that respectively correspond to the at least three different spectral bands. In such implementations, determining the calibration factor for the reflectance panel may include determining at least three calibration factors respectively for the at least three spectral bands respectively based at least in part on the at least three true panel intensity values and the calibration information, wherein the calibration information includes at least three percent reflectance values for the reflectance panel respectively for the three different spectral bands.

In such implementations, the at least three different spectral bands may include at least one of: a red spectral band, a green spectral band, and a blue spectral band; a green spectral band, a red spectral band, and an infrared spectral band; and a blue spectral band, a near infrared spectral band, and a middle infrared spectral band. In such implementations, the method 600 may further include using the at least three calibration factors to respectively compensate pixel values in the at least three spectral bands of at least one additional image.

In some implementations, an average raw panel intensity value for an area of pixels of the panel image that depict the reflectance panel may be used. In such implementations, identifying group of pixels of the at least one panel image that corresponds to the reflectance panel may include identifying a plurality of pixels of the at least one panel image that respectively correspond to the reflectance panel.

In implementations in which an average raw panel intensity value is used, determining the calibration factor for the reflectance panel may include: determining the average raw panel intensity value for the plurality of pixels of the at least one panel image that respectively correspond to the reflectance panel; adjusting the average raw panel intensity value for one or more of exposure, gain, linearity, offset, or lens effects to generate an average true panel intensity value; and determining the calibration factor for the reflectance panel based at least in part on the average true panel intensity value and the calibration information, wherein the calibration information includes at least one percent reflectance value for the reflectance panel for at least a portion of the electromagnetic spectrum.

In some implementations, the image capture device 140 may be a multispectral image capture device that includes a plurality of imagers that output image data respectively associated with a plurality of different spectral bands.

In implementations that include a multispectral image capture device, receiving a set of image information that represents a panel image may include receiving a plurality of sets of image information that respectively represent a plurality of panel sub-images respectively concurrently captured by a plurality of imagers included in the multispectral image capture device; and identifying group of pixels of the at least one panel image that corresponds to the reflectance panel may include identifying group of pixels of each of the panel sub-images that corresponds to the reflectance panel.

In implementations that include a multispectral image capture device, determining the calibration factor for the reflectance panel may include: determining at least one raw panel intensity value for the group of pixels of each of the panel sub-images; adjusting the at least one raw panel intensity value of each of the panel sub-images for one or more of exposure, gain, linearity, offset, or lens effects to generate at least one true panel intensity value for each panel sub-image; and determining a calibration factor for the reflectance panel for each panel sub-image based at least in part on the respective at least one true panel intensity value for such sub-image and the calibration information, wherein the calibration information includes at least one percent reflectance value for the reflectance panel for at least a portion of the electromagnetic spectrum.

In implementations that include a multispectral image capture device, the calibration information may include a plurality of different percent reflectance values respectively for a plurality of different spectral bands respectively associated with the plurality of different imagers of the multispectral image capture device. Thus, for example, a percent reflectance can be obtained for the reflectance panel for each wavelength of interest.

In implementations that include a multispectral image capture device, the method 600 may further include using the plurality of different percent reflectance values respectively for the plurality of different spectral bands to respectively compensate a plurality of additional images for incident light conditions, the plurality of additional images respectively captured by the plurality of different imagers of the multispectral image capture device.

Thus, for example, a calibration factor can be determined for each spectral band image by the image capture device, whether a single-imager or multiple-imager device. One or more of such calibration factors can be applied to each image, depending upon the number of spectral bands in which such image information is expressed or provided.

In one embodiment, the image capture device may include a plurality of image capture devices, such as an imager associated with a band. For example, there may be five bands of interest, red, blue, green, near infrared and infrared. Each band is associated with a particular wavelength of light.

As the image capture device gathers images of the reflectance panel, each imager for each band will capture an image of the reflectance panel. As each imager is configured for a particular band, the digital number average for the area of the reflectance portion for each band image will be different and thus will allow that band's images to be calibrated based on its reflectance panel image.

For each band, a reflectance calibration is determined for either the entire flight or for portions of the flight. As the incident light can change throughout a flight (clouds may move in front of the sun, the angle of the sun changes, etch), the reflectance calibration may change throughout the flight.

This reflectance calibration is intensity divided by reflectance where the intensity is represented by the average value of the pixels within the area 153. This average value may be an average value of the digital number of the pixels of that image. If there are different images of the reflectance panel in the series of images, such as at the beginning, in the middle, and at the end, there will be different intensity values calculated. The reflectance is the value gathered from the database. The reflectance may be stored in the database as a curve where the x values are wavelengths of light and the y values are reflectance percentages. The system will determine which portion of the curve to be accessing the reflectance percentage based on the band or wavelengths of interest. Those of skill in the art will recognize that many of the methods or algorithms set out herein may employ additional acts, may omit some acts, and/or may execute acts in a different order than specified.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A reflectance panel assembly, comprising:
   a platform;
   a reflectance panel on the platform, the reflectance panel including a surface having one or more known reflectance properties for at least a portion of an electromagnetic spectrum; and
   a machine-readable symbol on the platform and spaced apart from the reflectance panel, the machine-readable symbol including machine-readable information about at least one parameter of the surface of the reflectance panel.

2. The reflectance panel assembly of claim 1 wherein the machine-readable symbol and the surface of the reflectance panel are coplanar and adjacent to each other.

3. The reflectance panel assembly of claim 2 wherein the reflectance panel has at least one edge that detectably contrasts with a portion of the platform on which the reflectance panel is mounted.

4. The reflectance panel assembly of claim 2 wherein at least the surface of the reflectance panel is elevated relative to the platform.

5. The reflectance panel assembly of claim 2 wherein at least the surface of the reflectance panel is depressed relative to the platform.

6. The reflectance panel assembly of claim 1 wherein the machine-readable symbol comprises at least one element that enables detection of a relative orientation of the machine-readable symbol in an image.

7. The reflectance panel assembly of claim 1 wherein the reflectance panel includes a non-reflectance portion that abuts at least one edge of the surface of the reflectance panel and detectably contrasts with the surface of the reflectance panel.

8. A computer-implemented method to automatically compensate images for incident light conditions, the method comprising:

acquiring, by an image capture device, a plurality of images;

receiving, by one or more computing devices, the plurality of images, the plurality of images including a panel image depicting a reflectance panel on a platform and a machine-readable symbol on the platform and spaced apart from the reflectance panel, the reflectance panel including a surface having one or more known reflectance properties for at least a portion of an electromagnetic spectrum, the machine-readable symbol including information related to the reflectance panel;

identifying the panel image by analyzing the plurality of images with the one or more computing devices;

obtaining, by the one or more computing devices, calibration information associated with the reflectance panel based at least in part on the information included in the machine-readable symbol, the calibration information descriptive of one or more known reflectance properties of the surface of the reflectance panel for a portion of the electromagnetic spectrum;

identifying, by the one or more computing devices, a group of pixels of the panel image that corresponds to the surface of the reflectance panel; and adjusting, by the one or more computing devices, pixel values for each of the plurality of images to compensate for incident light conditions based at least in part on the calibration information and based at least in part on an intensity value respectively of the group of pixels of the panel image that corresponds to the surface of the reflectance panel.

9. The computer-implemented method of claim 8 wherein obtaining the calibration information includes identifying information representative of at least one edge of the reflectance panel that contrasts against a background in the panel image, the reflectance panel positioned on the background.

10. The computer-implemented method of claim 9, further comprising:

identifying, by the one or more computing devices, a scale of the reflectance panel depicted in the image; and scaling, by the one or more computing devices, the image until the scale of the reflectance panel reaches a predetermined scale.

11. The computer-implemented method of claim 8, further comprising:

identifying, by the one or more computing devices, an orientation of the reflectance panel in the panel image; and rotating, by the one or more computing devices, the panel image until the orientation of the reflectance panel reaches a predetermined orientation.

12. The computer-implemented method of claim 11 wherein identifying, the orientation of the reflectance panel includes identifying, by the one or more computing devices, an orientation of an element of the machine-readable symbol on the panel.

13. A method, comprising:

acquiring, by an image capture device, a plurality of images;

identifying from the plurality of images an image of a reflectance panel on a platform and a machine-readable symbol on the platform and spaced apart from the reflectance panel, the reflectance panel including at least one surface having one or more known reflectance properties for at least a portion of an electromagnetic spectrum, the machine-readable symbol including machine readable information about at least one parameter of the reflectance panel;

identifying a group of pixels in the image that corresponds to the at least one surface of the reflectance panel;

identifying the machine-readable symbol on the platform in the image; and calibrating the plurality of images based on the image of the reflectance panel and the machine-readable symbol on the platform.

14. The method of claim 13, further comprising:
detecting an identifier from the machine-readable symbol;
accessing a database and identifying calibration information in the database based on the identifier.

15. The method of claim 14, further comprising:
generating an intensity value by averaging values of the group of pixels,
wherein the calibrating the plurality of images includes calibrating the plurality of images with the calibration information and the intensity value.

* * * * *